H. S. OSBORNE.
APPARATUS FOR TESTING CAPACITY DEVIATIONS AND UNBALANCE OF ELECTRIC CONDUCTORS.
APPLICATION FILED JAN. 22, 1918.

1,375,414.

Patented Apr. 19, 1921.

INVENTOR
*H. S. Osborne*
BY
ATTORNEY

H. S. OSBORNE.
APPARATUS FOR TESTING CAPACITY DEVIATIONS AND UNBALANCE OF ELECTRIC CONDUCTORS.
APPLICATION FILED JAN. 22, 1918.

1,375,414.

Patented Apr. 19, 1921.
5 SHEETS—SHEET 2.

INVENTOR
H. S. Osborne
BY
ATTORNEY

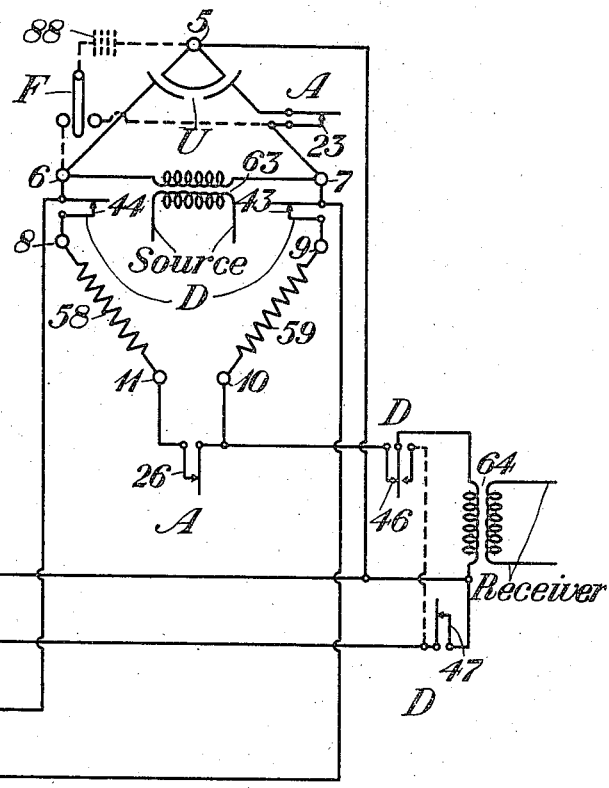
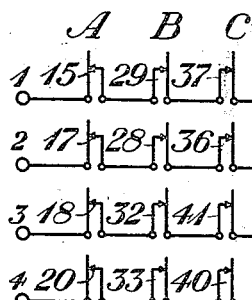
Fig. 3
Phantom to Side Unbalance
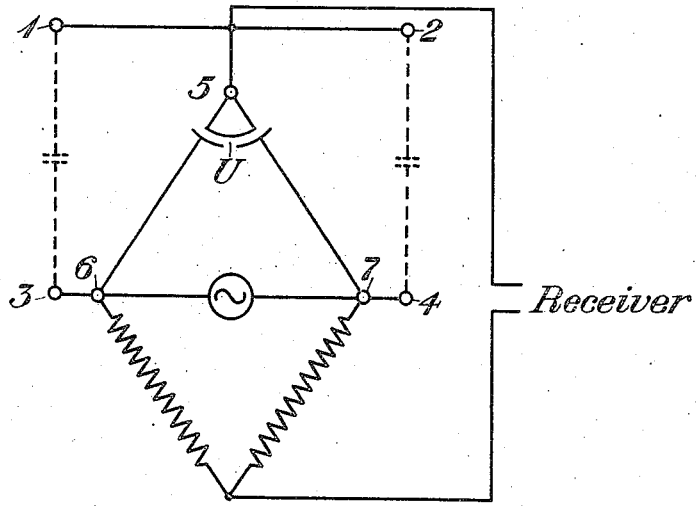
Fig. 4

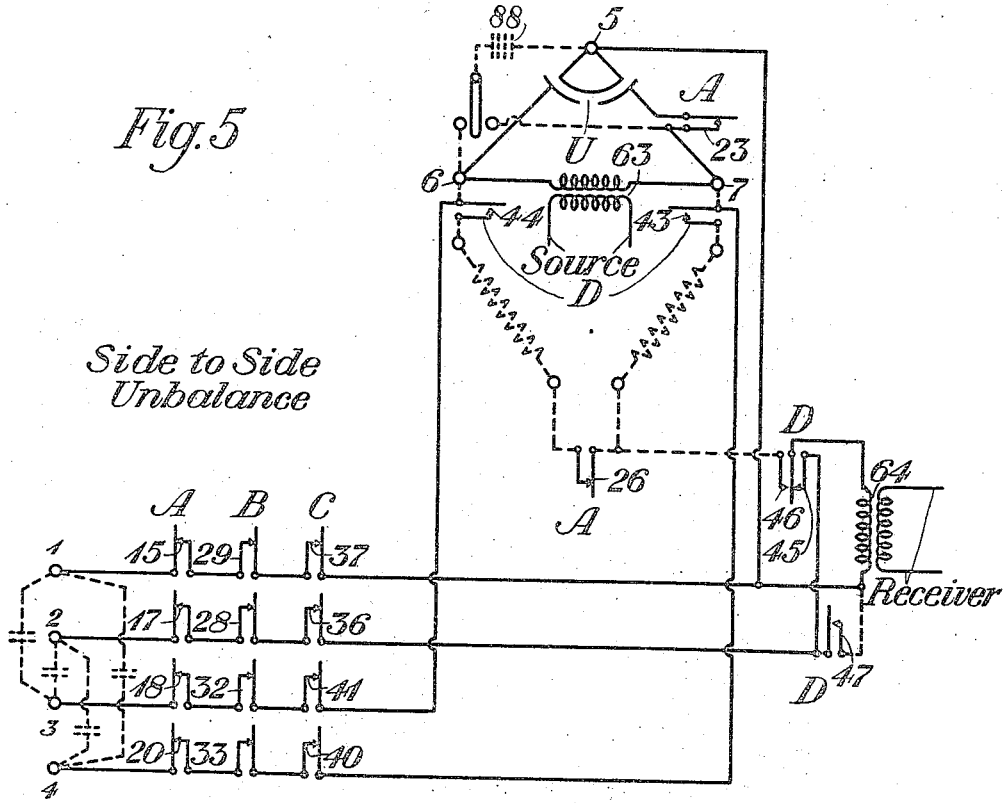
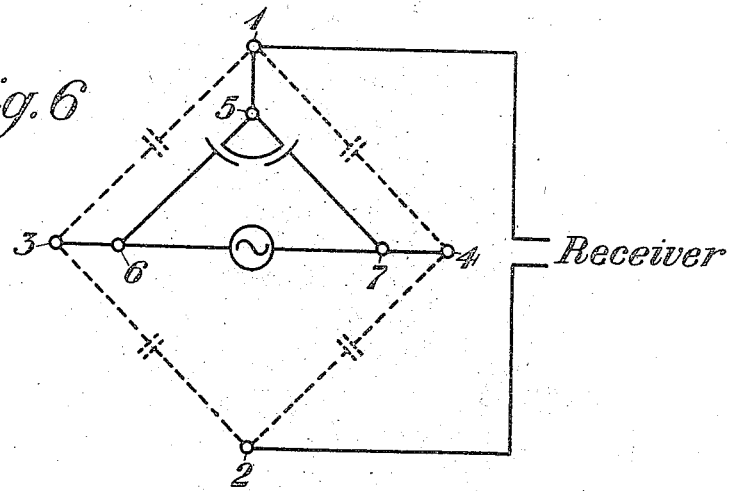

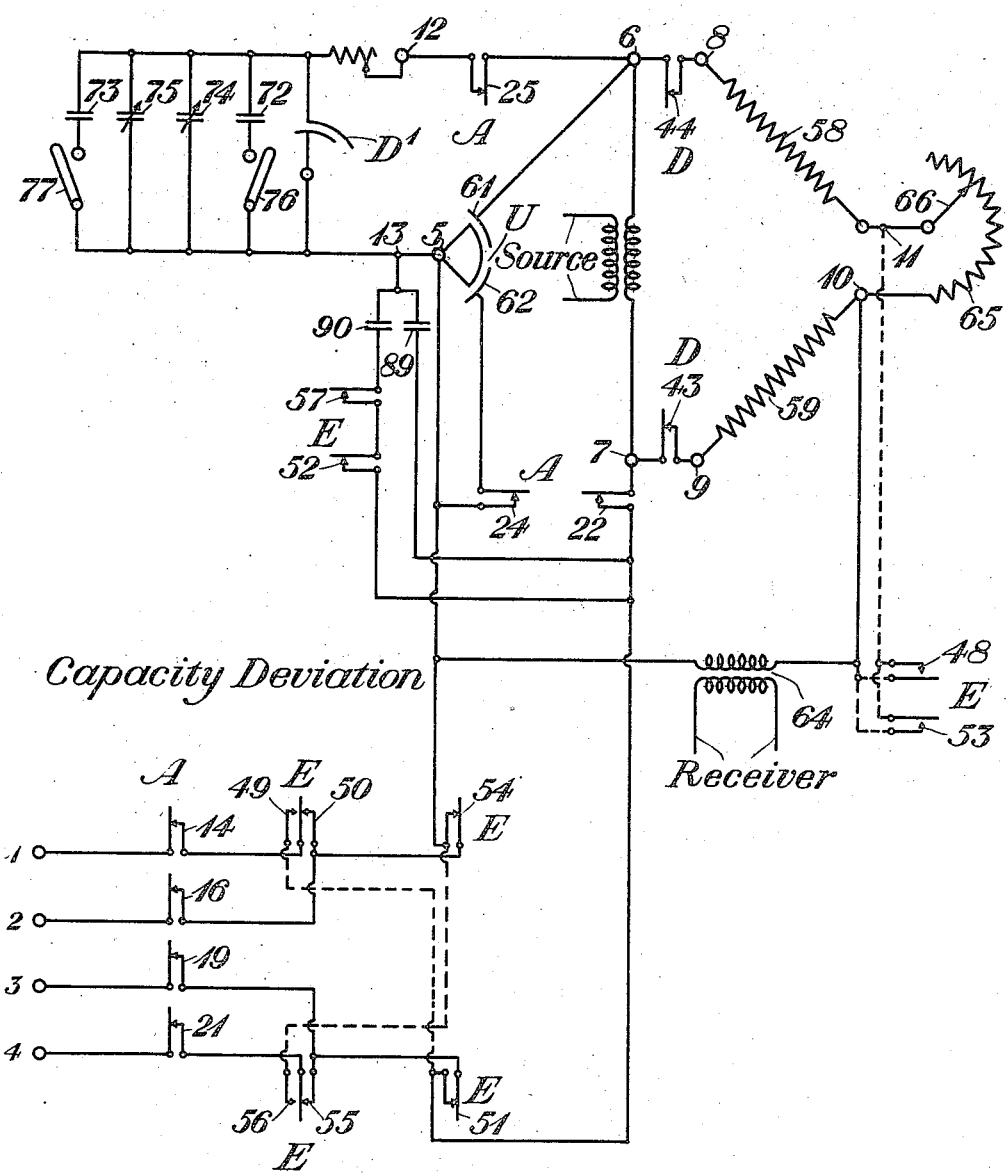

UNITED STATES PATENT OFFICE.

HAROLD S. OSBORNE, OF NEW YORK, N. Y., ASSIGNOR TO AMERICAN TELEPHONE AND TELEGRAPH COMPANY, A CORPORATION OF NEW YORK.

APPARATUS FOR TESTING CAPACITY DEVIATIONS AND UNBALANCE OF ELECTRIC CONDUCTORS.

1,375,414.  Specification of Letters Patent.  Patented Apr. 19, 1921.

Application filed January 22, 1918. Serial No. 213,191.

*To all whom it may concern:*

Be it known that I, HAROLD S. OSBORNE, residing at New York, in the county of New York and State of New York, have invented certain Improvements in Apparatus for Testing Capacity Deviations and Unbalance of Electric Conductors, of which the following is a specification.

This invention relates to apparatus for testing the capacity of electrical conductors, and more particularly to apparatus for testing the capacity of the conductors used in loaded cable circuits for telephonic transmission.

In the construction of loaded cable circuits for telephonic transmission, it is customary to arrange the conductors in groups of four called a "quad", each quad consisting of two pairs of conductors. The conductors of each pair are twisted about each other and used as the parallel line conductors of the "side" circuit, the pairs being also twisted about each other and each pair forming one side of the line of a so-called "phantom" circuit. Each section of cable between loading points is made up of a number of lengths which are spliced together and it has been heretofore the practice to test the capacity unbalance of the side and phantom circuits making up the several quads of which each cable length is composed, and then to splice together the side and phantom conductors of quads of adjacent cable lengths in such a manner that the capacity unbalance of the side and phantom circuits of any loading section shall tend to neutralize each other, so that the capacity unbalance of the side and phantom circuits of each quad extending between loading points shall be as low as possible. This construction, while tending to reduce the cross-talk between the side circuits, and between side and phantom circuits of the quad of a given loading section, failed to take into account the requirement that in loading lines, the total capacity of each loading section of a transmission circuit should be as nearly equal as possible.

In order to comply with this requirement it is proposed to compare the capacity of each side and phantom circuit of a cable length with a predetermined standard, and then splice the conductors of the several quads so as to neutralize the capacity unbalances so far as possible, and at the same time keep the capacity deviation of each loading section within certain limits, so that the total capacity of each loading section shall not depart by more than a certain amount from the predetermined standard capacity for a loading section.

It is one of the objects of the present invention to provide a testing apparatus to determine the capacity unbalance of the side and phantom circuits of each quad and to also determine the capacity deviation of each side and phantom circuit from a predetermined standard, in order to facilitate making the splices of the cable lengths in accordance with the method just outlined. The method referred to is not a part of the present invention but is made the subject matter of a separate application.

The invention will be more fully understood by reference to the accompanying drawings in which:

Fig. 3 is a somewhat simplified diagram indicating the circuit conditions during a test of the capacity unbalance between a phantom circuit and a side circuit;

Fig. 4 is a schematic diagram to illustrate the phantom to side unbalance producing cross-talk between phantom and side circuits;

Fig. 5 is a diagram similar to that of Fig. 3 but showing the circuit conditions during a test of the capacity unbalance between two side circuits;

Fig. 6 is a schematic diagram to illustrate the side to side unbalance producing cross-talk between adjacent side circuits; and Fig. 7 is a somewhat simplified diagram of the circuit conditions during a capacity deviation test.

Figure 1:
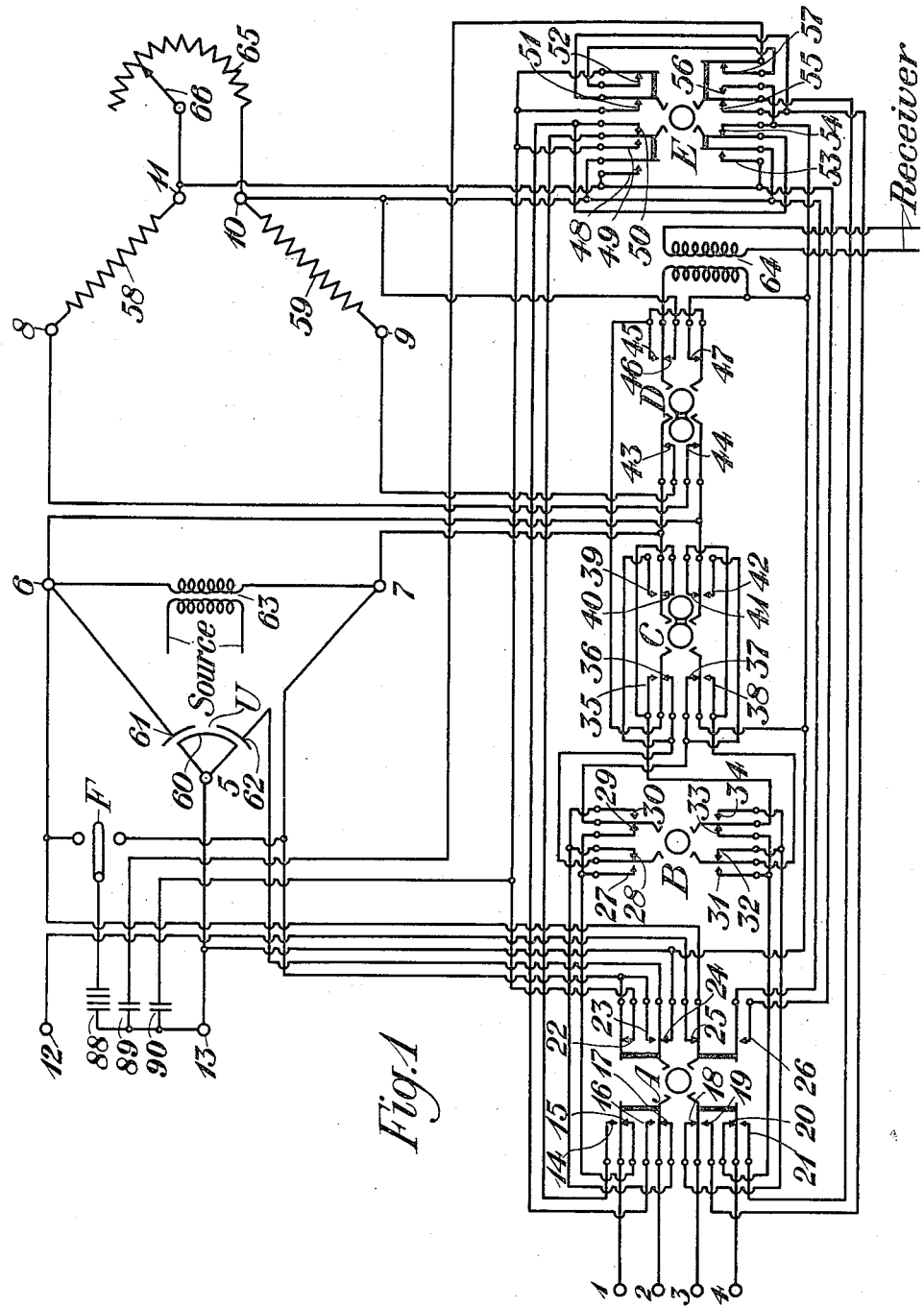
Figure 1 is a detailed diagram of the circuits of the testing set.

Referring to Fig. 1, terminals 1, 2, 3 and 4 are provided to which the four conductors of a quad to be tested may be connected. A Wheatstone bridge is also provided, of which resistances 58 and 59 form two arms connected between terminals 8 and 11, and 9 and 10 respectively, the other two arms of the bridge being formed by the two halves of an air condenser U upon which the capacity unbalance may be indicated. The condenser U is comprised of a plate 60 to which is opposed two plates 61 and 62, the plate 60 being movable about an axis so as to vary the capacity between the plates, producing in effect two separate variable condensers, one of which is connected between terminals 5 and 6, the other being connected between terminals 5 and 7. Terminals 12 and 13 are provided for the attachment of the standard capacity net-work shown in Fig. 2. A source of current variations such as a "howler" is coupled through a transformer 63 to a conductor connecting opposite terminals 6 and 7 of the bridge, while a receiving apparatus may be coupled through transformer 64 to the other pair of bridge terminals 5 and 10, the latter of which may be connected to terminal 11 through a short-circuit connection. When desired, the ratio of the arms of the bridge including equal resistances 58 and 59, which is unity when the shortcircuit between terminals 10 and 11 is closed in a manner hereinafter described, may be varied by including in one arm of the bridge an adjustable resistance 65 which may be varied by setting a switch arm 66. When making capacity unbalance tests the ratio of the resistance arms should be unity and the resistance 65 is therefore shortcircuited. The same condition obtains during measurements of the capacity deviation of a side circuit from a given standard. As the standard capacity for a phantom circuit is greater than that of a side circuit, in order to avoid using a second net-work, set to the standard phantom capacity, the resistance of the arm including resistance 58 may be increased by setting the switch 66 so as to include sufficient resistance 65 to make the ratio of the two resistance arms equal to the ratio of the standard phantom to standard side capacity.

Keys A, B, C, D and E are provided for making the various circuit adjustments in connection with the several tests. Keys A, B and E each have three positions, key A controlling contacts numbered 14 to 26 inclusive, key B controlling contacts numbered 27 to 34 inclusive, and key E controlling contacts numbered 48 to 57 inclusive. Keys C and D have but two positions, key C controlling contacts 35 to 42 inclusive, while key D controls contacts 43 to 47 inclusive.

Figure 2:
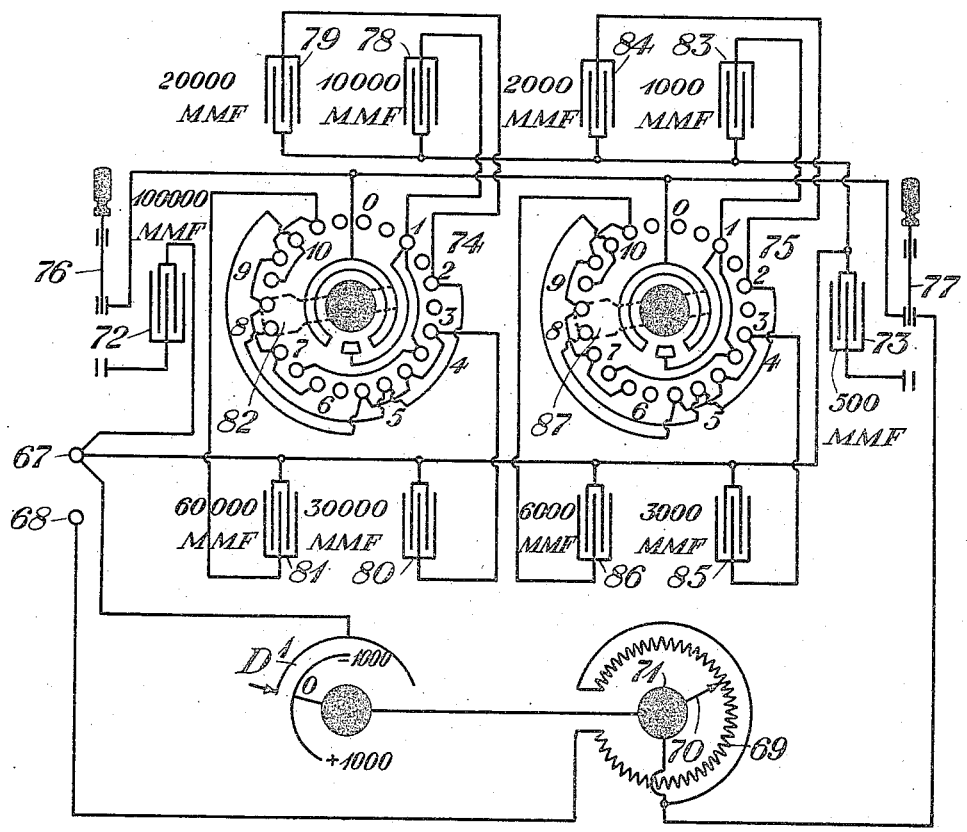
Fig. 2 is a detailed diagram of a net work which may be set to the desired standard capacity with which a given circuit is to be compared.

Referring to Fig. 2, the standard capacity net-work is provided with terminals 67 and 68 whereby it may be connected to terminals 12 and 13 of the testing circuit. In circuit with terminal 68 is a variable resistance 69 controlled by a switch 70, which may be set so as to balance the difference between the leakage of the condensers of the net-work and that of the cable. An air condenser D' is bridged between terminal 71 of variable resistance 69 and terminal 67, said condenser being capable of adjustment, and reading from −1000 micro-microfarads to +1000 micro-microfarads to indicate by its setting the deviation of the tested circuit from a standard capacity to which the capacity net-work is adjusted. In order to set the network to a predetermined standard capacity, condensers 72 and 73 together with condenser sets 74 and 75 are provided. Condenser 72 of 100000 micro-microfarads may be connected across terminals 67 and 71 in parallel with condenser D' by closing a switch 76, while condenser 73 of 500 micro-microfarads may be similarly connected by throwing switch 77. Condenser set 74 comprises four condensers 78, 79, 80 and 81 under the control of a rotary switch 82 which may be set to any one of 11 positions. In the zero position the condensers are not in circuit, but in the several positions from 1 to 10 inclusive, they are connected in various combinations in such manner that a capacity ranging from 10000 to 100000 micro-microfarads in steps of 10000 may be bridged across terminals 67 and 71. Similarly condenser set 75 consists of four condensers 83, 84, 85 and 86 under control of a rotary switch 87 by which a capacity ranging from 1000 to 10000 micro-microfarads may be bridged across terminals 67 and 71 in steps of 1000 micro-microfarads as the switch is moved from position 1 to position 10. In the zero position the condenser set is not in circuit. It will thus be seen that the capacity net-work as a whole may be set to any value between zero and 210000 micro-microfarads in steps of 1000 by suitable manipulation of switches 76, 82 and 87, and by manipulation of switch 77 controlling 500 micro-microfarad condenser 73 the steps may be made 500 micro-microfarads instead of 1000.

With this general description of the apparatus in mind the invention may be fully understood from a description of the operation. Assuming that it is desired to test the capacity unbalance of a section of cable, the four conductors of a quad are connected to terminals 1, 2, 3, and 4, the conductors of one side circuit being connected to terminals 1 and 2, and the conductors of the other side circuit being connected to terminals 3 and 4. The key A is thrown to the right for unbalance measurements opening contacts 22, 24 and 25 and closing contacts 23 and 26, the key E remaining in its normal condition as it performs no function in connection with unbalance measurements. If keys B, C and D are permitted to remain in normal condition, the circuits will be in condition for a measurement of the capacity unbalance between the phantom circuit and the side circuit connected to terminals 3 and 4. In order to more clearly understand the circuit conditions now existing attention is called to the simplified diagram of Fig. 3 and the schematic diagram of Fig. 4. The capacity unbalance between the phantom and side circuit is the condition which produces cross-talk between side and phantom circuits. If, then, a source of current variations is connected to the side circuit associated with terminals 3 and 4, as shown in Fig. 4, while a receiver is connected to the middle points of conductors connecting conductors 1—2 and 3—4 respectively, any unbalance in the capacity between terminals 1—3 and 2—4 respectively, indicated in dotted lines in Fig. 4, will result in so-called cross-talk in the receiver. By adjusting condenser U the capacity between points 1—3 and 2—4 may be balanced so that no cross-talk results. The setting of condenser U will then be a measure of the capacity unbalance tending to produce cross-talk. Referring now to Fig. 3 the circuits resulting from the setting of the keys of the apparatus of Fig. 1 as above described, may be traced as follows:

From terminal 1 a chortcircuit connection extends over contacts 15, 29, 37, 47, 36, 28 and 17 to terminal 2. Similarly a connection extends from terminal 3 over contacts 18, 32, 41 and 44, and thence through resistance arm 58, contact 26, resistance arm 59, and contacts 43, 40, 33 and 20 to terminal 4. A source of current is bridged across terminals 3 and 4 at terminals 6 and 7, said source being inductively coupled through transformer 63. From a mid-point of the connection traced between terminals 1 and 2 a connection extends through a winding of induction coil 64 of the receiver circuit, over contact 46 to the mid-point of resistance arms 58 and 59. Likewise a connection extends from the mid-point of the connection between terminals 1 and 2 to terminal 5 of condenser U, and thence in parallel through the two halves of condenser U to terminals 6 and 7 respectively. It will thus be seen that the circuits are arranged so as to bring about the conditions shown schematically in Fig. 4. Condenser U may now be adjusted until a minimum sound is heard in the receiver, and the setting of said condenser will indicate the capacity unbalance between the phantom circuit conductors and the side circuit conductors connected to terminals 3 and 4.

If it is desired to determine the capacity unbalance between the phantom conductors, and the side circuit conductors connected to terminals 1 and 2, the key C may be thrown to the left, thereby connecting terminals 1 and 2 to terminals 6 and 7 respectively, shortcircuiting terminals 3 and 4, and connecting a mid-point of said shortcircuit to one terminal of the primary winding of induction coil 64. As these circuits are similar to those illustrated in Fig. 3 they need not be traced in detail. Condenser U is again adjusted until a balance is obtained, the setting indicating the capacity unbalance. In case the capacity unbalance exceeds that of one-half of the condenser U, the capacity of one side of the condenser U may be increased 500 micro-microfarads by connecting condenser 88 across terminals 5—6 or 5—7 as the case may be by means of a switch F. It will be noted that in the phantom to side measurements resistance 65 is shortcircuited by contacts 26 of key A.

If it be desired to determine the capacity unbalance between the side circuits, key A should be allowed to remain thrown to the right, key C should be restored to normal and key D thrown to the right, keys B and E remaining in normal condition as before. The circuits may now be more clearly understood from Figs. 5 and 6. The conditions causing cross-talk between side circuits is schematically indicated in Fig. 6, a source of current being bridged across the terminals 3 and 4 of one side circuit and a receiver being bridged across the terminals 1 and 2 of the other side circuit. The capacity between the several conductors of the quad is indicated in dotted lines in Fig. 6, the capacities being in effect connected between terminals 1—3, 1—4, 2—3 and 2—4, the resultant circuit being a Wheatstone bridge the arms of which constitute the capacities acting across the several terminals of the quad. Any unbalance of the arms of this bridge causes corresponding cross-talk in the receiver. By adjusting the condenser U, the two halves of which are in parallel with two arms of the bridge, until a balance is obtained, the setting of the condenser will indicate the capacity unbalance.

Referring now to Fig. 5, in which the circuit conditions resulting from the setting of the keys last described is illustrated, it will be noted that a source of current is connected across terminals 3 and 4 by a circuit from terminal 3, over contacts 18, 32 and 41 through the secondary winding of induction coil 63, over contacts 40, 33 and 20 to terminal 4. The receiver is bridged across terminals 1 and 2 by a circuit from terminal 1 over contacts 15, 29 and 37, and through the primary winding of induction coil 64, and over contacts 45, 36, 28 and 17 to terminal 2. Also one-half of condenser U is bridged across terminals 1 and 3 by a circuit from terminal 1, over contacts 15, 29, 37, terminal 5, one side of condenser U to terminal 6 and thence over contacts 41, 32 and 18 to terminal 3, the other half of the condenser being bridged between terminals 1 and 4 over circuit previously traced to terminal 5 and thence through the other half of the condenser and over contacts 23, 40, 33 and 20 to terminal 4. By adjusting condenser U until a balance is obtained, the capacity unbalance will be indicated by the setting of the condenser.

If it is desired to determine the capacity deviation of the various circuits, i. e., the deviation of each circuit from a predetermined standard capacity, key A is thrown to the left, with keys B, C and D in normal condition, and the capacity net-work of Fig. 2 is connected to terminals 12 and 13 of Fig. 1. If the key E is permitted to remain in normal position the circuits are now in condition to determine the deviation of the phantom circuit from the standard capacity. The condensers 72 and 73, together with the condenser sets 74 and 75 and the condenser U are set to the predetermined standard capacity for a side circuit, and resistance 65 adjusted until the ratio of the resistance between terminals 8 and 10 to the resistance between terminals 9 and 10 is equal to the ratio of the standard phantom capacity to standard side capacity. When the condenser D' is set to zero there is actually a capacity of 1000 micro-microfarads between its plates. This is compensated for by the fact that the scale of the condenser U, which is used to indicate the capacity between the plates 61 and 60 of said condenser in setting up the standard capacity, gives a reading of 1000 micro-microfarads in excess of the actual capacity between its plates, so that while the scale of neither condenser gives a true reading, the algebraic sum of the readings is equal to the sum of the capacities between the two sets of plates.

Referring now to the simplified diagram of Fig. 7 it will be seen that the circuits assume the form of a Wheatstone bridge of which the resistance arms form two elements, plates 61 and 60 of the condenser U, condenser D', 72 and 73, and condenser sets 74 and 75 in parallel form a third element and the circuit whose capacity deviation is to be tested forms the fourth element. When key A was thrown to the left plates 62 of condenser U were shortcircuited at contact 24. The circuits are now in condition for measuring the deviation of the phantom circuit from the standard phantom capacity and may be traced as follows:

The conductors attached to terminals 1 and 2 are shortcircuited by a connection from terminal 1 over contacts 14, 50 and 16 to terminal 2, while the conductors attached to terminals 3 and 4 are shortcircuited by a connection from terminal 3 over contacts 19, 55 and 21 to terminal 4. The shortcircuit connection between terminals 1 and 2 is connected over contact 54 to terminal 5, the connection between terminals 3 and 4 being likewise connected over contacts 51 and 22 to terminal 7. The shortcircuit about resistance 65 is opened at contacts 48 and 53.

A current source is inductively connected across terminals 6 and 7 of the bridge, while a receiver is inductively connected across terminals 5 and 10 of the bridge by induction coil 64. The condenser D' is then adjusted until the bridge is balanced, and the reading of the condenser is the deviation of the phantom circuit from the standard phantom capacity, divided by the ratio which is set on switch 66. Although the capacity net-work together with condenser U is set to the standard side capacity, the setting of condenser D' indicates the actual deviation from the standard phantom capacity, divided by the ratio which is set on switch 66, as the ratio resistance 65 compensates for the difference between the two standards.

If it is desired to measure the deviation of the side circuit connected to terminals 1 and 2, key E is thrown to its upper position, opening contacts 50 and 51 and closing contacts 48 and 49. Resistance 65 is shortcircuited and terminals 3 and 4 are now disconnected from the bridge, while terminal 1 is connected over contacts 14, 49 and 22 to terminal 7 of the bridge, and terminal 2 is connected over contacts 16 and 54 to terminal 5 of the bridge. Condenser D' is again adjusted until the bridge is balanced, when the setting of the condenser indicates the deviation of the capacity of the side circuit connected to terminals 1 and 2 from the standard. Similarly by throwing key E to its lower position contacts 48, 49, 54 and 55 are opened and contacts 50, 51, 53 and 56 closed, terminals 1 and 2 being disconnected from the bridge at contact 54 and terminals 3 and 4 being connected to terminals 7 and 5 of the bridge respectively, while resistance 65 is shortcircuited by contact 53. The condenser D' may now be adjusted to balance the bridge, thereby indicating the deviation of the side circuit connected to terminals 3 and 4 from the standard.

It will be noted that condensers 89 and 90 are bridged across terminals 5 and 7 of the bridge in making capacity deviation tests, the condenser 90 being disconnected by the opening of contact 57 or 52 when key E is thrown out of its normal position in making a side circuit deviation test. These condensers are used to maintain the zero of the set constant. There is a certain amount of capacity due to the wiring of the set itself and this capacity is less for side circuit deviation wiring than for phantom deviation wiring. This difference is equalized by condensers 89 and 90, the latter being disconnected during side circuit deviation tests, to maintain the total capacity of the wiring of the set (which is accounted for in determining the zero of the set) at the same value.

The key B is not used in making either deviation or unbalance tests, its purpose being to reverse the connection of the leads from terminals 1, 2, 3 and 4 in checking the zero of the set for unbalance measurements. When B is thrown to its upper position the connection of terminals 1 and 2 is reversed, while in its lower position the connection of terminals 3 and 4 is reversed.

From the preceding description it is apparent that by this invention a simple and efficient apparatus has been devised, which by a few manipulations of moving parts may be adjusted to make both capacity unbalance and capacity deviation tests of the side and phantom circuits of a group of conductors, and while the invention has been illustrated as embodied in a certain specific form, it will be understood that it is capable of embodiment in many and varied structures without departing from the spirit of the appended claims.

What is claimed is:

1. A testing system, comprising circuit terminals to which a circuit element under test may be connected, a standard capacity with which said circuit element is to be compared, and means to balance the difference between the capacity of the circuit element and said standard, said means being arranged to indicate directly the deviation of the capacity of said circuit element from the capacity of said standard.

2. A testing system comprising a Wheatstone bridge arrangement, a net-work comprising adjustable capacity elements forming one arm of the bridge, circuit terminals to which a circuit element to be tested may be connected to form another arm of the bridge, certain of said capacity elements being adjustable to a predetermined standard capacity with which said circuit is to be compared and other of said elements being adjustable to balance the bridge, and means responsive to the adjustment of said other elements to directly indicate the difference between the capacity of the circuit element to be tested and said standard.

3. A testing system comprising circuit terminals to which may be connected a plurality of circuit elements of different types which are to be tested by comparing said circuit elements with a plurality of standard capacities corresponding to the different types, an auxiliary apparatus adjustable to one of said standard capacities, means to associate one of said circuit elements with the auxiliary apparatus, means to indicate the difference between the capacity of said circuit element and the corresponding standard to which the auxiliary apparatus is set, means to associate another type of circuit element with said auxiliary apparatus, and compensating means whereby said indicating means will indicate the difference between the capacity of said circuit element and its corresponding standard when it is compared to the different standard to which the auxiliary apparatus is set.

4. A testing system comprising circuit terminals to which may be connected a plurality of conductors capable of association in phantom and side circuit relation, a standard comparison capacity, means to associate said conductors in side circuit relation with said standard capacity, means to indicate the difference between the side circuit capacity and the standard, means to associate said conductors in phantom relation with said standard, and compensating means whereby said indicating means will indicate the difference between the phantom capacity of said conductors and the predetermined standard phantom capacity.

5. A testing system comprising circuit terminals to which may be connected a plurality of circuit elements of different types which are to be tested by comparing said circuit elements with standard capacities corresponding to the different types, a standard capacity element set to the standard corresponding to one of said types, a pair of resistance arms, said arms and said capacity element being arranged to form three arms of a Wheatstone bridge, means to associate one of said types of circuit elements with the fourth arm of said bridge, means to balance the bridge and thereby indicate the difference between the capacity of the circuit element thus associated with the bridge and the standard to which the capacity element is set, means to associate a second type of circuit element with the fourth arm of the bridge, means to connect compensating resistance in one of the resistance arms of the bridge, whereby when the bridge is balanced said balancing means will indicate the difference between the capacity of said second type of circuit element and the standard capacity corresponding to that type.

6. A testing system comprising circuit terminals to which may be connected a plurality of conductors capable of arrangement in phantom and side circuit relation, a capacity element set to a predetermined standard side circuit capacity, a pair of resistance arms, said arms and said capacity element forming three arms of a Wheatstone bridge, means to associate said conductors in side circuit relation with the fourth arm of the bridge, means to balance the bridge and thereby indicate the difference between the side circuit capacity of said conductors and the standard side circuit capacity, means to associate said conductors with said fourth arm of the bridge in phantom circuit relation, and means to include compensating resistance in one of said resistance arms whereby when the bridge is balanced, said balancing means will indicate the difference between the phantom capacity of said conductors and a predetermined standard phantom capacity.

7. A system for testing capacity unbalance and deviation comprising circuit terminals to which may be connected a plurality of conductors capable of arrangement in phantom and side circuit relation, means to arrange said conductors in phantom circuit relation with certain of said conductors in side circuit relation, a current source and a receiving device, and means to associate the one with the phantom circuit and the other with the side circuit thereby producing a cross-talk effect in the receiver, means for balancing out said cross-talk effect and thereby indicating the capacity unbalance between the phantom and side circuit, a standard capacity element, means to associate said conductors with said standard capacity element, and means to balance the difference between the capacity of said conductors and of said standard, said means being arranged to directly indicate the difference between the capacity of said conductors and said standard.

8. A system for testing capacity unbalance and deviation comprising circuit terminals to which may be connected a plurality of conductors capable of arrangement in phantom and side circuit relation, means to arrange said conductors in phantom circuit relation with certain of said conductors in side circuit relation, a current source and a receiving device, and means to associate the one with the phantom circuit and the other with the side circuit thereby producing a cross-talk effect in the receiver, means for balancing out said cross-talk effect and thereby indicating the capacity unbalance between the phantom and side circuit, means to associate said conductors in side circuit relation, with said current source and receiving means connected the one to one circuit and the other to another circuit, thereby producing cross-talk effect on the receiver, means to balance out the cross-talk effect and thereby indicate the unbalance between the side circuits, a standard capacity element, means to associate said conductors with said standard capacity element and means to balance the difference between the capacity of said conductors and of said standard, said means being arranged to directly indicate the difference between the capacity of said conductors and said standard.

In testimony whereof, I have signed my name to this specification this 15th day of January, 1918.

HAROLD S. OSBORNE.